July 20, 1937.  S. POWELL  2,087,780

POCKET DOUCHE PACKAGE

Filed July 10, 1936

INVENTOR
Stanley Powell
BY
ATTORNEY

Patented July 20, 1937

2,087,780

UNITED STATES PATENT OFFICE 2,087,780

POCKET DOUCHE PACKAGE

Stanley Powell, New York, N. Y.

Application July 10, 1936, Serial No. 90,016

6 Claims. (Cl. 128—227)

This invention relates to new and useful improvements in a douche package.

The invention has for an object the construction of a douche package which is characterized by a small waterproof casing in which a small waterproof or rubber bag and connected waterproof tubing, and douche tips may be readily stored.

It is an object of this invention to associate a support plate to the top edge of the rubber bag in a novel manner to be capable of supporting the rubber bag from various points and types of support.

Specifically, it is contemplated to so arrange the support plate that it may be disposed in a horizontal position and clamped beneath the lower edge of the door of a medicine chest or similar object.

A further object of the invention is to provide an arrangement whereby the support plate may be placed in a vertical position on the upper portion of the rubber bag and then clamped between the hinged side of a door and the door jamb to support the rubber bag.

A still further object of the invention is the provision of a cord or similar element provided with a loop and tying the support plate and rubber bag together in a novel manner.

Still further the invention contemplates the provision of a douche tip made from sections so that they may be disassembled when desired.

Another object of the invention is the provision of a rectal tip which may be engaged into one of the sections of the douche tip so that an enema may be taken with the package when desired.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Figure 1:
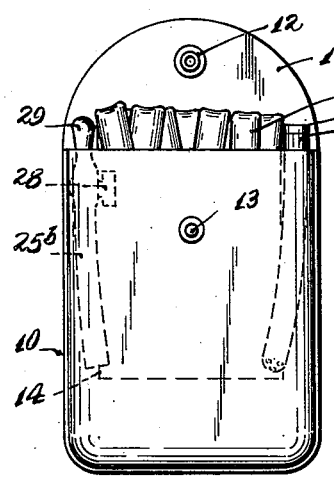
Fig. 1 is a front elevational view of a douche package embodying this invention and illustrated with the rubber bag and tube wound thereon partially removed from the casing.
Figure 3:
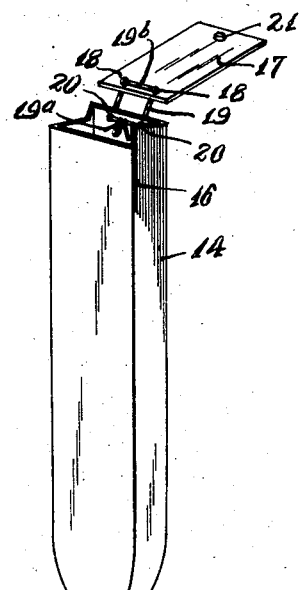
Fig. 3 is a perspective view of the rubber bag and tube in an open position.

In Fig. 1 a small rubber or waterproof casing 10 is illustrated provided with a cover flap 11 which has a snap fastener element 12 thereon cooperative with a snap fastener element 13 on the front side of the casing by which the casing may be closed. This casing is adapted to store and hold the douche bag and rubber tube shown in Fig. 3 and the douche tip shown in Fig. 6.

Figure 2:
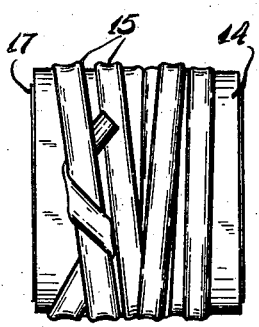
Fig. 2 is a face view of the rubber bag and tube per se.

In Fig. 2 the douche bag and tube are shown in their folded condition as they appear when removed from the casing. In Fig. 1 the sectional portions of the douche tip are shown in position.

The douche bag comprises a bag 14 which is open at the top and which has a closed bottom with an outlet connecting with a rubber tube 15. The details of the bag 14 and tube 15 form no part of the invention. These parts may be made from oiled silk or other waterproof material. The bag 14 is formed with folds 16 at the sides so that the front and back portions may be collapsed against each other. A support plate 17 is formed with a pair of openings 18 which are engaged by a cord 19. This cord is also laced through a pair of openings 20 in the top portion of the back side of the bag 14.

The cord 19 is tied to have a loop portion 19ª by which the bag may be supported on a nail or other similar supporting device. From the loop portion 19 there are portions of the cord which extend through the openings 20 to the back side of the bag 14 and extend upwards to the back side of the support plate 17, and then through the openings 18, and these portions are there connected together by a joining portion 19ᵇ. With this arrangement the supported plate 17 may be directed rearwards at right angles to the back section of the bag 14 and so support the bag. This support plate 17 is also formed with an opening 21 in the top portion thereof by which it may be engaged on a supporting nail or similar article.

The support plate 17 when in the horizontal position is adapted to be clamped between the bottom edge of the door of the medicine chest or other similar article usually present in bathrooms, and the base wall of the cabinet. Thus, the douche may be supported at places not provided with supporting nails or the like.

Figures 4, 7:
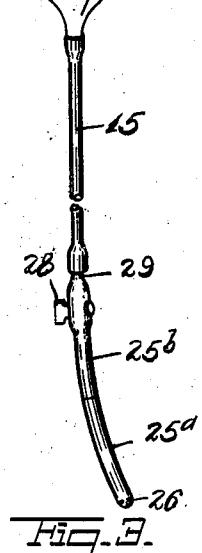
Fig. 4 is a fragmentary perspective rear view of Fig. 3 showing details of the connection between the support plate and the top back edge of the rubber bag.
Fig. 7 is a detailed elevational view of one of the sections of the douche tip associated with a rectal tip.
Figure 5:
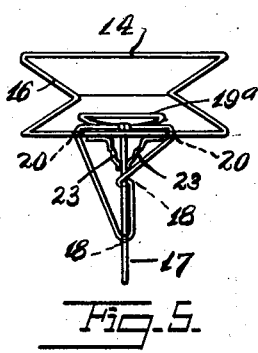
Fig. 5 is a plan view of the rubber bag with the support plate placed in the vertical position.

Still further a pair of small clips 23 are mounted upon the back face of the bag 14 spaced slightly downwards from the top edge thereof, as clearly shown in Fig. 4. When desired the plate 17 may be twisted through substantially 90° and then folded downwards so that one edge thereof engages between the clips 23, as clearly shown in Figs. 4 and 5. In Fig. 4 the dot and dash lines 17' indicate the plate in this latter position. In Fig. 5 the formation of the cord 19 is clearly shown when the support plate is in said position.

With the support plate in the vertical position shown in Figs. 4 and 5 it is possible to support the douche between the hinged side of a door and the door jamb. Thus, if a bathroom is not provided with a medicine chest it is still adapted to support the douche bag between the door and door jamb, since all bathrooms are provided with doors.

Figure 6:
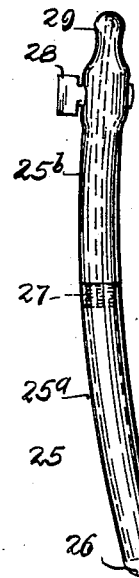
Fig. 6 is a detailed elevational view of the douche tip.

In Fig. 6 a tip for the douche is shown and comprises sections 25$^a$ and 25$^b$. The section 25$^a$ has a plurality of openings 26 in its outer extremity. A screw connection 27 is provided between the adjacent ends of the sections for connecting them together. A control valve 28 is mounted upon the inner end of the inner section. This section also has a flared portion 29 upon which the free end of the rubber tubing 15 may be engaged. In Fig. 1 the douche sections 25$^a$ and 25$^b$ are shown at the sides of the folded bag.

In Fig. 7 a modification of the invention is shown in which the outer douche tip 25$^a$ forms a casing for holding a rectal tip 30. This rectal tip may be removed from the section 25$^a$ when desired. It must be removed when the douche is used or when it itself is being used.

The support plate 17 has an auxiliary purpose. It acts as a core upon which the douche bag 14 and the tubing 15 may be wound. Fig. 2 shows the bag and tube wound upon said core.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:—

1. In a douche package, a rubber bag having an open top and a closed bottom with an outlet connecting with a rubber tube for a douche tip, a support plate adjacent the top edge of said bag, a cord laced through openings in said plate and bag, and a clip on the backside of said bag for receiving the edge of said plate and holding it edgewise, said plate being provided with a pair of spaced openings, and the back side and the top portion of said douche bag being also provided with an opening through which said cord is laced.

2. In a douche package, a rubber bag having an open top and a closed bottom with an outlet connecting with a rubber tube for a douche tip, a support plate adjacent the top edge of said bag, a cord laced through openings in said plate and bag, and a clip on the backside of said bag for receiving the edge of said plate and holding it edgewise, said plate being provided with a pair of spaced openings, and the back side and the top portion of said douche bag being also provided with an opening through which said cord is laced, said cord being also formed with a loop portion by which the bag may be supported on a nail.

3. In a douche package, a rubber bag having an open top and a closed bottom with an outlet connecting with a rubber tube for a douche tip, a support plate adjacent the top edge of said bag, a cord laced through openings in said plate and bag, and a clip on the backside of said bag for receiving the edge of said plate and holding it edgewise, said plate being formed with an aperture near the outer end thereof.

4. In a douche package, a rubber bag having an open top and a closed bottom with an outlet connecting with a rubber tube for a douche tip, a support plate adjacent the top edge of said bag, a cord laced through openings in said plate and bag, and a clip on the backside of said bag for receiving the edge of said plate and holding it edgewise, said clip comprising a pair of slightly spaced clip sections between which the edge portion of the plate may be engaged.

5. In a douche package, a rubber bag having an open top and a closed bottom with an outlet connecting with a rubber tube for a douche tip, a support plate adjacent the top edge of said bag, a cord laced through openings in said plate and bag, and a clip on the backside of said bag for receiving the edge of said plate and holding it edgewise, said rubber bag and tube being adapted to be wound around said support plate as a core.

6. In a douche package, a waterproof bag having an open top and a closed bottom with an outlet connecting with a rubber tube for a douche tip, a support plate adjacent the top edge of said bag, a cord laced through openings in said plate and bag, and a clip on the backside of said bag for receiving the edge of said plate and holding it edgewise.

STANLEY POWELL.